US012601682B2

(12) United States Patent
Yanagimoto

(10) Patent No.: US 12,601,682 B2
(45) Date of Patent: Apr. 14, 2026

(54) OPEN RESONATOR

(71) Applicant: EM labs, Inc., Kobe (JP)

(72) Inventor: Yoshiyuki Yanagimoto, Kobe (JP)

(73) Assignee: EM labs, Inc., Kobe (JP)

( * ) Notice: Subject to any disclaimer, the term of this patent is extended or adjusted under 35 U.S.C. 154(b) by 144 days.

(21) Appl. No.: 18/426,362

(22) Filed: Jan. 30, 2024

(65) Prior Publication Data

US 2024/0167951 A1 May 23, 2024

Related U.S. Application Data

(63) Continuation of application No. PCT/JP2022/039882, filed on Oct. 26, 2022.

(30) Foreign Application Priority Data

Dec. 14, 2021 (JP) ................................. 2021-202167

(51) Int. Cl.
| | |
|---|---|
| *G01N 21/59* | (2006.01) |
| *G01N 21/45* | (2006.01) |
| *G01N 21/55* | (2014.01) |
| *G01R 27/04* | (2006.01) |
| *G01R 27/26* | (2006.01) |
| *G01R 33/34* | (2006.01) |

(52) U.S. Cl.
CPC ....... *G01N 21/59* (2013.01); *G01N 2201/068* (2013.01)

(58) Field of Classification Search
CPC ........ G01N 21/45; G01N 21/55; G01N 21/59; G01R 27/04; G01R 27/26; G01R 33/34
See application file for complete search history.

(56) References Cited

U.S. PATENT DOCUMENTS

| | | | | |
|---|---|---|---|---|
| 5,450,040 A | * | 9/1995 | Matsui | ..................... H01Q 3/46 |
| | | | | 331/107 S |
| 6,496,018 B1 | * | 12/2002 | Nagata | ................... G01N 22/00 |
| | | | | 324/636 |

(Continued)

FOREIGN PATENT DOCUMENTS

| | | |
|---|---|---|
| JP | H08-102621 A | 4/1996 |
| JP | 2015-529804 A | 10/2015 |

OTHER PUBLICATIONS

A. L. Cullen and P. K. Yu, The accurate measurement of permittivity by means of open resonator, Proc. R. Soc. Lond. A. 325, 493-509 (1971).

(Continued)

*Primary Examiner* — Neel D Shah

(74) *Attorney, Agent, or Firm* — Yokoi & Co., U.S.A.; Toshiyuki Yokoi

(57) ABSTRACT

An open resonator capable of measuring dielectric characteristic of a sample having anisotropy in a dielectric constant with high accuracy. The open resonator includes two spherical reflection mirrors respectively having two reflection spherical surfaces which are arranged to face each other; and a signal injection portion for inputting an input signal used for measuring a dielectric characteristic of a sample arranged between the two reflection spherical surfaces. At least one of the two spherical reflection mirrors has a groove formed along at least one of the two reflection spherical surfaces of the at least one of the two spherical reflection mirrors.

7 Claims, 13 Drawing Sheets

(56)     References Cited

U.S. PATENT DOCUMENTS

2013/0063158 A1      3/2013  Potrepka et al.
2016/0161576 A1      6/2016  Krahn et al.
2019/0199051 A1*     6/2019  Herr ..................... H01S 3/0621

OTHER PUBLICATIONS

Minoru Sanagi, et al., "Power Combining by a Fabry-Perot Reso-
nator with Active Devices Mounted on Both the Mirrors", IEICE
Transactions On Electronics, Institute of Electronics, vol. E84-C,
No. 10, pp. 1575-1580, Oct. 1, 2001.
Fei Ding, et al., "Gradient metasurfaces: a review of fundamentals
and applications", Reports On Progress in Physics, Institute of
Physics Publishing, vol. 81, No. 2, p. 26401, Dec. 18, 2017.

* cited by examiner transmission
coefficient
(dB)

frequency (GHz)

transmission coefficient (dB)

frequency (GHz)

transmission
coefficient
(dB)

frequency (GHz)

transmission
coefficient
(dB)

frequency (GHz)

OPEN RESONATOR

CROSS-REFERENCE TO RELATED APPLICATIONS

This application claims the benefit of priority and is a Continuation application of the prior International Patent Application No. PCT/JP2022/039882, with an international filing date of Oct. 26, 2022, which designated the United States, and is related to the Japanese Patent Application No. 2021-202167, filed Dec. 14, 2021, the entire disclosures of all applications are expressly incorporated by reference in their entirety herein.

PRIOR ART

[Non-Patent Document 1] A. L. CULLEN and P. K. YU, The accurate measurement of permittivity by means of open resonator, Proc. R. Soc. Lond. A. 325, 493-509 (1971)

BACKGROUND OF THE INVENTION

The present invention relates to an open resonator suitable for measuring dielectric characteristic (real part (relative dielectric constant E') of complex relative dielectric constant and dielectric tangent (tan 6)) of dielectric materials.

In the application fields of an on-vehicle radar, an optical communication, a high-speed digital equipment and the like, the frequency in the millimeter wave band is used. It is necessary to improve the position resolution in the radar, increase the communication speed in the optical communication and accelerate the processing in the digital equipment. Thus, it is assumed that the frequency of the millimeter wave to be used is further increased. Currently, the frequency bands of 75-80 GHz, 50 GHz and 40 GHz are used in the most advanced equipment. The frequency range exceeding 100 GHz is assumed in future. In addition, the discussion is held assuming to use the band up to 330 GHz in the sixth-generation communication system (6G) coming next to the fifth-generation communication system (5G). Accordingly, the measurement using higher frequency is required when measuring the material characteristic used for the above described equipment. In the material characteristic, a major problem is energy loss in the millimeter wave caused by high frequency. Thus, it is necessary to solve the problem about the measurement of the dielectric characteristic of the material.

In the measurement of the dielectric characteristic in the millimeter wave band, the reduction of the energy loss is the particularly important purpose to be developed. Thus, the measurement of the dielectric tangent (loss factor, tan 6) is important and the measurement using the resonator is mainly used in the conventional manner. A split cylinder resonator is a typical equipment for performing the above described measurement. The split cylinder resonator is used for measuring the dielectric tangent of low loss materials in the upper limit of approximately 60 GHz. However, it is difficult for the split cylinder resonator to correctly measure the dielectric characteristic in the frequency higher than 60 GHz. An open resonator (Fabry-Perot resonator) is suitable in the frequency higher than 60 GHz (Non-Patent Document 1).

In the Fabry-Perot resonator, the sample formed into a film shape is inserted between two spherical reflection mirrors arranged to face each other, an input signal having a frequency of approximately 100 GHz is inputted, for example, the resonance measurement is performed to obtain a resonance waveform and the dielectric characteristic of the sample is measured. A network analyzer is frequently used for the resonance measurement. The network analyzer is connected to the Fabry-Perot resonator. A graph showing a frequency as a horizontal axis and a transmission signal intensity (transmission coefficient) as a vertical axis is obtained to measure the resonance characteristics. Here, "resonance characteristics" mean the center frequency (resonance frequency) of the resonance and Q value (ratio between center frequency and 3 dB band width in the specification of the present invention). In general, the relative dielectric constant and the dielectric tangent of the sample are obtained from the resonance characteristics with/ without the sample by calculation or simulation.

Since each of the spherical reflection mirrors of the Fabry-Perot resonator is axially symmetrical with respect to the central axis, the shape of the resonator is same with respect to a vertical polarization component and a horizontal polarization component of the input signal. Thus, when the vertical polarization component and the horizontal polarization component are included in the input signal to be inputted, the resonance frequency measured in a state that the sample is not inserted (empty state) is same between the case of the vertical polarization component and the case of the horizontal polarization component. Namely, in the resonance of TEM00q mode in the Fabry-Perot resonator, two resonance modes (the resonance mode of the vertical polarization component and the resonance mode of the horizontal polarization component) are degenerated.

The actual Fabry-Perot resonator is designed to excite only the vertical polarization component in the input signal to be inputted. However, since there is a certain restriction (error) for the accuracy of processing and assembling, the horizontal polarization component is also excited. In particular, the relative dielectric constant $\varepsilon v'$ in the vertical direction is different from the relative dielectric constant $\varepsilon h'$ in the horizontal direction in the sample having anisotropy. When the sample having anisotropy is inserted in the Fabry-Perot resonator where the resonance frequency of the vertical polarization component is same as the resonance frequency of the horizontal polarization component, the degeneracy is resolved and the difference occurs between the resonance frequency of the vertical polarization component and the resonance frequency of the horizontal polarization component. Thus, two resonance frequencies are observed in the resonance waveform. As described above, when the resonance waveform of the horizontal polarization component is superimposed on the resonance waveform of the vertical polarization component to be measured, it becomes difficult to measure the dielectric characteristic of the sample correctly.

SUMMARY OF THE INVENTION

The present invention provides an open resonator capable of measuring the dielectric characteristic of the sample having anisotropy in the dielectric constant with higher accuracy.

The open resonator of the present disclosure includes: two spherical reflection mirrors respectively having two reflection spherical surfaces which are arranged to face each other; and a signal injection portion for inputting an input signal used for measuring a dielectric characteristic of a sample arranged between the two reflection spherical surfaces. At least one of the two spherical reflection mirrors has a groove formed along at least one of the two reflection spherical surfaces of the at least one of the two spherical reflection mirrors.

When the open resonator of the present disclosure is used, since the dielectric characteristic of the sample can be measured substantially using only the vertical polarization component which is the signal used for the measurement, the dielectric characteristic of the sample having anisotropy can be measured with high accuracy.

DETAILED DESCRIPTION OF THE INVENTION

Embodiment 1

Figure 1:
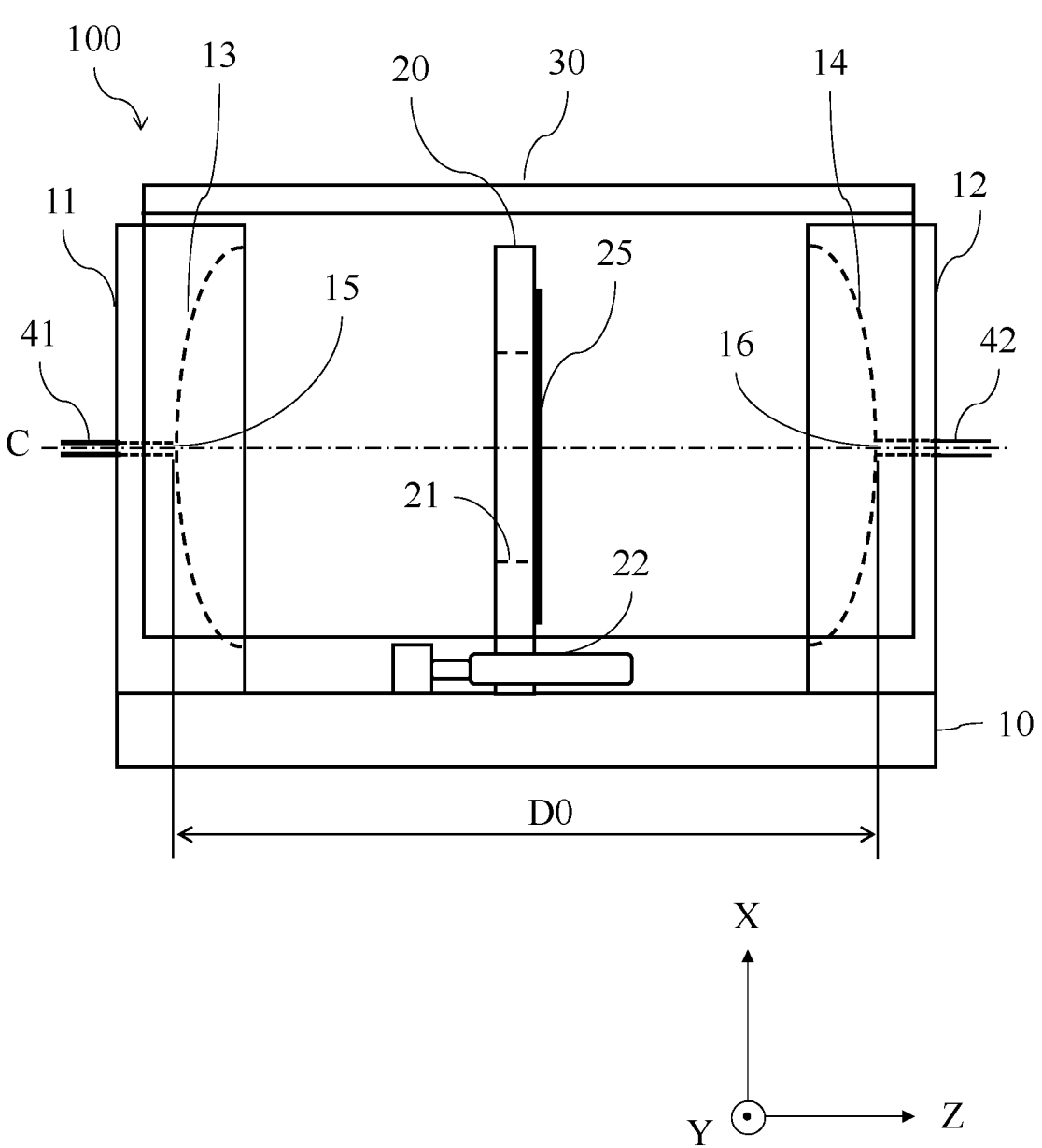
FIG. 1 is a schematic diagram of a Fabry-Perot resonator concerning the embodiment 1.

FIG. 1 is a schematic diagram of the Fabry-Perot resonator concerning the embodiment 1. As shown in FIG. 1, a Fabry-Perot resonator 100 concerning the embodiment 1 includes a fixing stand 10, a first spherical reflection mirror 11, a second spherical reflection mirror 12, a sample stand 20, a micrometer 22 and a cover 30. The Fabry-Perot resonator 100 is an example of the open resonator. In the following explanation, the explanation will be made by using the XYZ coordinate system shown in FIG. 1. The X-direction corresponds to the up-down direction, the Y-direction corresponds to the front-rear direction and the Z-direction corresponds to the left-right direction.

As shown in FIG. 1, the first spherical reflection mirror 11 having a first reflection spherical surface 13 and the second spherical reflection mirror 12 having a second reflection spherical surface 14 are arranged on the fixing stand 10 to face each other. At this time, the center of the first reflection spherical surface 13 and the center of the second reflection spherical surface 14 are separated from each other at a predetermined spherical surface distance D0 (distance between two spherical surfaces). A first waveguide 41 and a second waveguide 42 are arranged (formed) respectively on the center of the first reflection spherical surface 13 and the center of the second reflection spherical surface 14 along a central axis C. A first coupling hole 15 having a minute diameter and a second coupling hole 16 having a minute diameter are formed respectively on front end opening portions (spherical surface side) of the first waveguide 41 and the second waveguide 42 to form a coupled state for obtaining the desired resonance characteristics. The first waveguide 41 of the first spherical reflection mirror 11 is a signal injection portion to input a measurement signal for measuring the dielectric characteristic of the sample from the first waveguide 41. The second waveguide 42 of the second spherical reflection mirror 12 is a signal detection portion to output the detection signal from the second waveguide 42.

The sample stand 20 includes a through hole 21. The sample stand 20 is arranged between the first spherical reflection mirror 11 and the second spherical reflection mirror 12 which face each other. The sample stand 20 is a holder for mounting a sample 25 on the sample stand 20 so that the dielectric characteristic of the sample 25 is measured. The sample 25 is mounted so that the sample 25 covers the through hole 21. The micrometer 22 is mounted for adjusting the position of the sample 25 mounted on the sample stand 20 in the left-right direction (Z-direction). The micrometer 22 is a position adjustment mechanism capable of adjusting the position of the sample 25 mounted on the sample stand 20 by adjusting the position of the sample stand 20 in the Z-direction with respect to the fixing stand 10 (i.e., the first spherical reflection mirror 11 and the second spherical reflection mirror 12).

The cover 30 is formed in a U shape by a front board, a back board and a top board connecting the front board with the back board. The front board, the back board and the top board are formed of a transparent acrylic plate. As shown in FIG. 1, when measuring the dielectric characteristic, the front board, the back board and the top board of the cover 30 respectively cover the front surface, back surface and the top surface of the Fabry-Perot resonator 100. When mounting the sample, the cover 30 is slid upward and detached from the Fabry-Perot resonator 100. Thus, a space between the first spherical reflection mirror 11 and the second spherical reflection mirror 12 (i.e., space where the sample stand is arranged) is exposed.

Figure 2A:
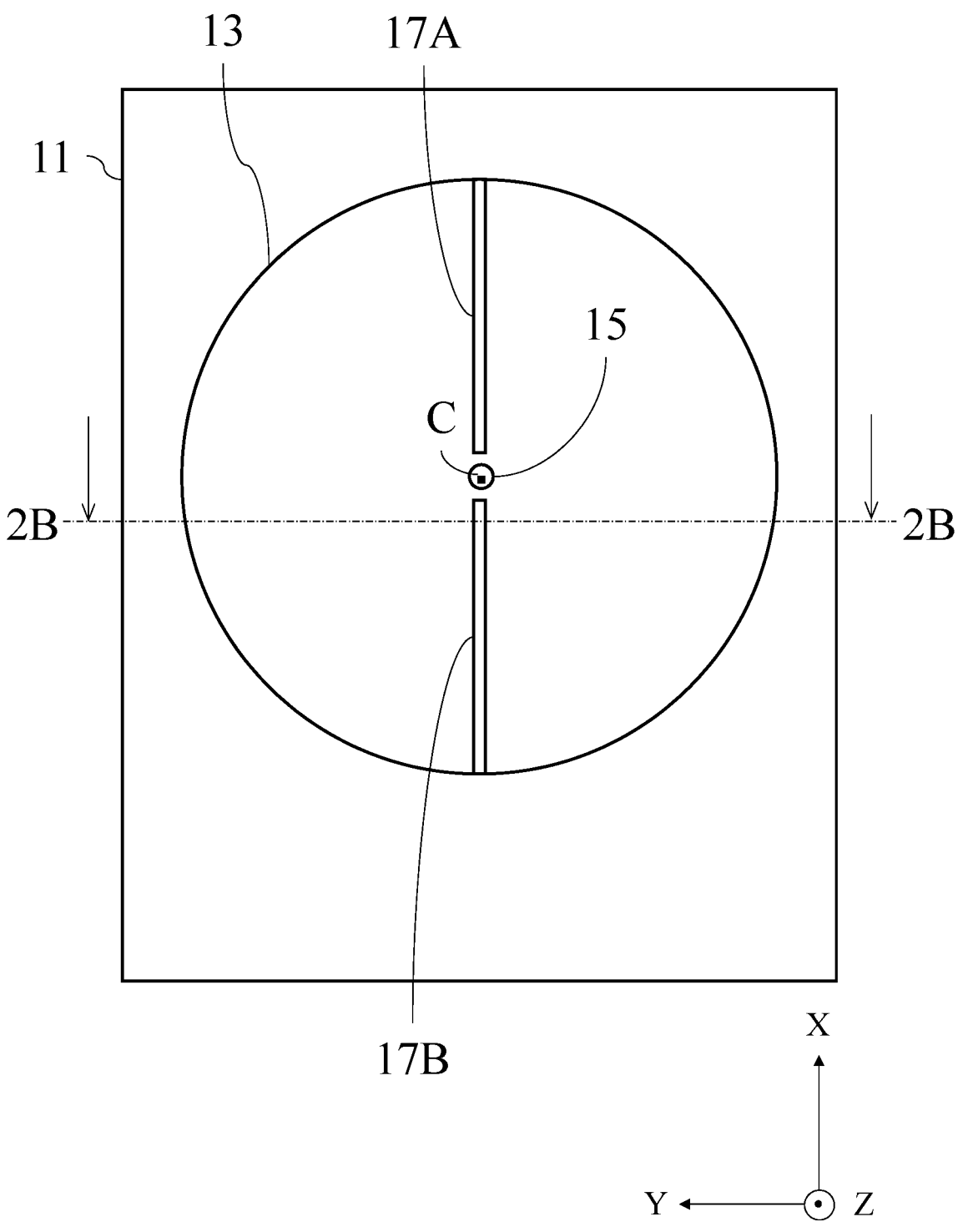
FIG. 2A is a schematic diagram of a spherical reflection mirror of the Fabry-Perot resonator viewed from the Z-direction concerning the embodiment 1.
Figure 2B:
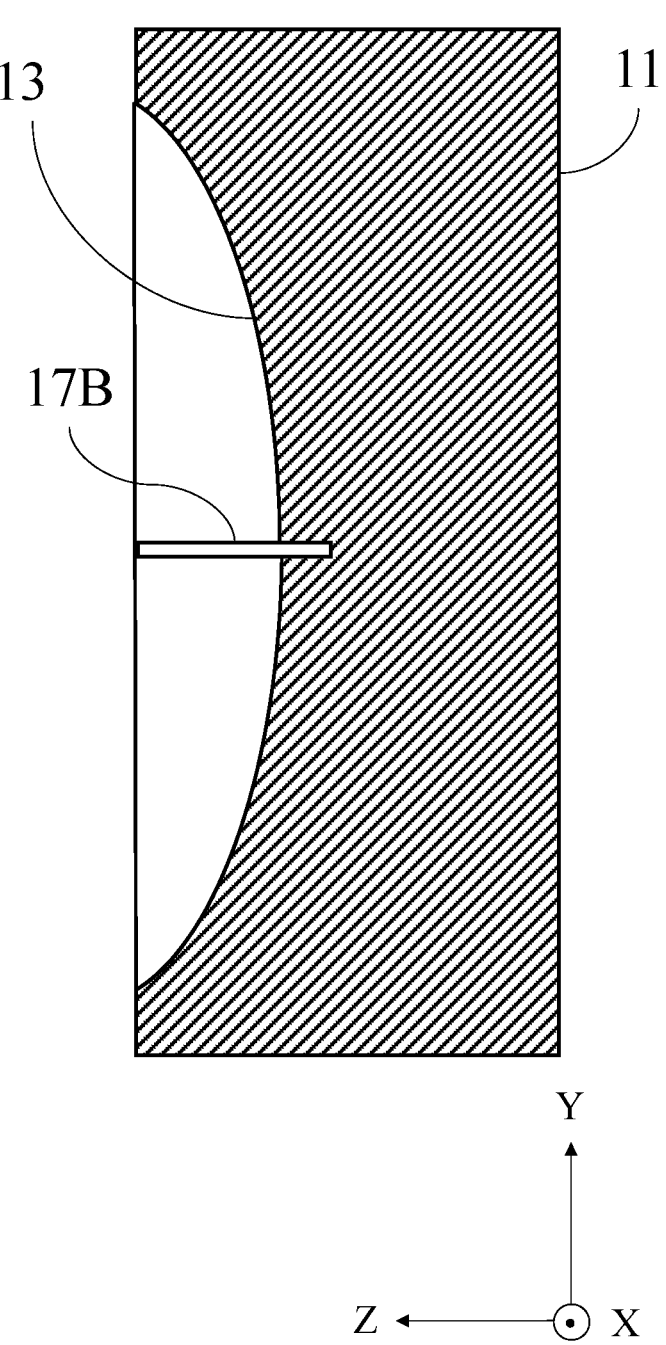
FIG. 2B is an explanation drawing showing a cross-section cut along a cross-sectional line 2B-2B shown in FIG. 2A.

FIG. 2A is a schematic diagram of the first spherical reflection mirror 11 of the Fabry-Perot resonator 100 viewed from the Z-direction. FIG. 2B is an explanation drawing showing a cross-section cut along a cross-sectional line 2B-2B shown in FIG. 2A. As shown in FIG. 2A and FIG. 2B, the first spherical reflection mirror 11 includes the first reflection spherical surface 13, the first coupling hole 15 formed on the center of the first reflection spherical surface 13 and grooves 17A, 17B (collectively called grooves 17) formed on the first reflection spherical surface 13. The grooves 17A, 17B are axially symmetrical with respect to the central axis C (Z-direction) of the first reflection spherical surface 13 as a symmetry axis. The grooves 17A, 17B are separated from the first coupling hole at a predetermined distance (1 mm in the embodiment 1). The grooves 17A, 17B are formed to end port portions of the first reflection spherical surface 13 in the up-down direction (vertical direction). It is not necessary to form the grooves 17 to the end portions as long as the grooves 17 are formed to the vicinity of the end portion of the first reflection spherical surface 13 (the distance to the end portion is approximately 1 mm). The grooves 17 are arranged to be separated from the first coupling hole 15 for avoiding the deformation of the shape of the first coupling hole 15 caused by the contact of the grooves 17.

In addition, the grooves 17 are formed in the vertical direction along the ZX-plane passing through the central axis C and arranged plane-symmetrically with respect to the YZ-plane passing through the central axis C. Here, the vertical direction is the extending direction (X-direction) of the grooves 17 when the grooves 17 are projected on the XY-plane. The vertical direction is the direction parallel to the ZX-plane. The vertical direction substantially matches with the direction of the electric field of the input signal. Namely, the direction of the electric field of the input signal is basically the vertical direction. The word "basically" is used because although the input signal is inputted from the first waveguide 41 so that the direction of the electric field is aligned with the vertical direction (i.e., the vertical polarization component), it is unavoidable that the component of the horizontal signal (horizontal polarization component) is generated in the actually inputted input signal in relation to the dimensional error of the first waveguide 41, the processing accuracy of the first coupling hole 15 and the arrangement precision between the first coupling hole 15 and the first waveguide 41 as a matter of practice. In the Fabry-Perot resonator 100, the spherical surface distance D0 is 120 mm, the radius of the first reflection spherical surface 13 and the second reflection spherical surface 14 is 96 mm, the depth of the spherical surface is 5 mm, the radius of the circle projected on the XY-plane is approximately 30.6 mm, the depth of the grooves 17 is 0.8 mm and the width of the grooves 17 is 0.2 mm. The measurement frequency of the Fabry-Perot resonator 100 is 75 to 110 GHz. The depth (0.8 mm) of the grooves 17 is specified to be approximately one-fourth (quarter) of a wavelength of the measurement frequency. This is because a surface current flowing though the reflection spherical surface in the horizontal direction becomes the minimum (approximately zero) when the depth of the groove is one-fourth of the wavelength of the measurement frequency. In addition, when the depth of the groove is a half of the wavelength of the measurement frequency, the effect of suppressing the surface current is almost eliminated. Therefore, even in the highest measurement frequency, the depth of the groove is preferably less than a half of the wavelength. Accordingly, it is preferable that the depth of the groove is specified to be within the range of more than or equal to one-eighth of the wavelength of the measurement frequency and less than a half of the wavelength of the measurement frequency.

(Measurement of Dielectric Characteristic)

The steps of the measurement of the dielectric characteristic measured by the Fabry-Perot resonator 100 are shown below.

1) The Fabry-Perot resonator 100, the network analyzer and the controller are connected with each other via a cable.

2) In a state that the sample is not mounted (without the sample), the resonance characteristic (first resonance characteristic) is measured in the resonance frequency to be measured. The Q value $Q_{empty}$ is calculated from a band width of a resonance waveform.

3) The resonances (resonance frequencies) are measured at five points including the frequency to be measured and the frequencies before and behind it. The spherical surface distance D0 between the reflection spherical surfaces is calculated from the resonance frequencies of the five points.

4) After the cover 30 of the Fabry-Perot resonator 100 is detached and the sample 25 is mounted on the sample stand 20, a space between the first spherical reflection mirror 11 and the second spherical reflection mirror 12 is covered with the cover 30.

5) The micrometer 22 is operated to adjust the position of the sample 25. Namely, the position of the sample 25 is aligned with the position where the resonance frequency becomes the minimum.

6) In a state that the position of the sample 25 is adjusted (with sample), the resonance characteristic (second resonance characteristic) is measured in the resonance frequency to be measured. The center frequency (resonance frequency $F_{sample}$) and the Q value $Q_{sample}$ are calculated for the resonance shifted by inserting the sample 25.

7) The relative dielectric constant E' and the dielectric tangent tan 6 of the sample are calculated from the thickness t of the sample 25, the spherical surface distance D0, the Q value empty measured without the sample, the resonance frequency $F_{sample}$ measured with the sample and the Q value $Q_{sample}$ measured with the sample.

When measuring the dielectric characteristic in a plurality of frequencies for the same sample 25, after the above described step 1), the above described steps 2) and 3) are performed for all frequencies to be measured. Then, after the above described steps 4) and 5) are performed, the above described steps 6) and 7) are performed for all frequencies to be measured.

(Effect and the Like)

In the Fabry-Perot resonator, the resonance characteristics are measured by reflecting the input signal to be inputted on the metal surface of the reflection spherical surfaces facing to each other. The input signal to be inputted is reflected on the reflection spherical surfaces because the current flows on the metal surface and the electric field cannot enter into the inside of the metal (boundary condition of the metal surface: ε=0). Accordingly, when the metal surface of the reflection spherical surface is uniform without having the grooves 17, both the vertical polarization component and the horizontal polarization component of the input signal are reflected similarly. On the other hand, when the grooves 17 are formed along the ZX-plane as shown in the first reflection spherical surface 13 of the Fabry-Perot resonator 100 of FIG. 2A and FIG. 2B, although the surface current flowing in the vertical direction which is parallel with the ZX-plan is not affected, the surface current flowing in the horizontal direction crossing the ZX-plane hardly flows. Accordingly, the vertical polarization component of the input signal is totally reflected while the reflection of the electromagnetic wave of the horizontal polarization component is week and the resonance of the horizontal polarization component is almost eliminated and reduced to an unmeasurable level.

Figure 3A:
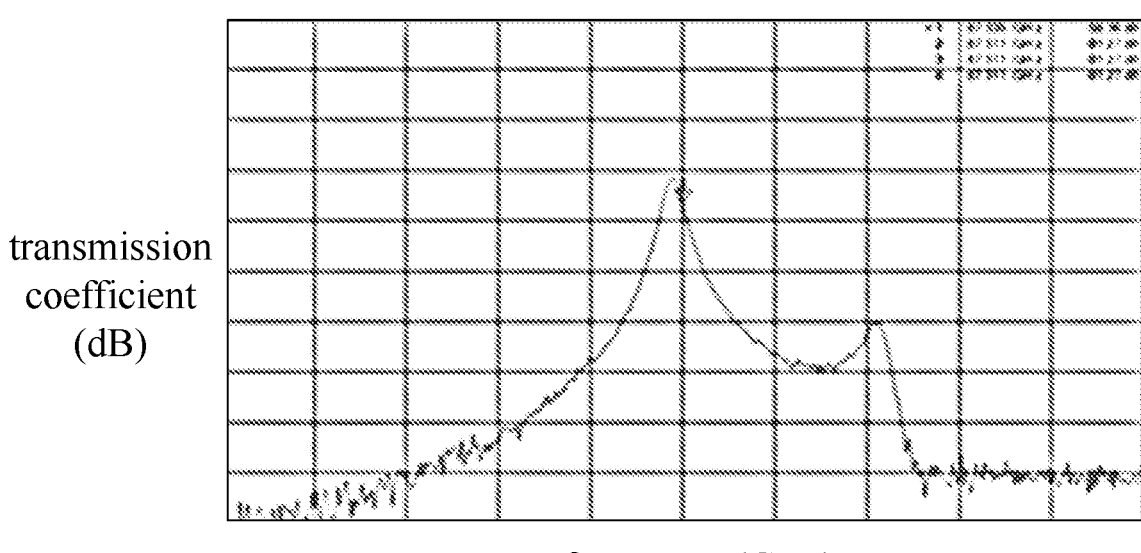
FIG. 3A is a drawing showing the resonance waveform where the degeneracy of the resonation is resolved by the anisotropy (large anisotropy).
Figure 3B:
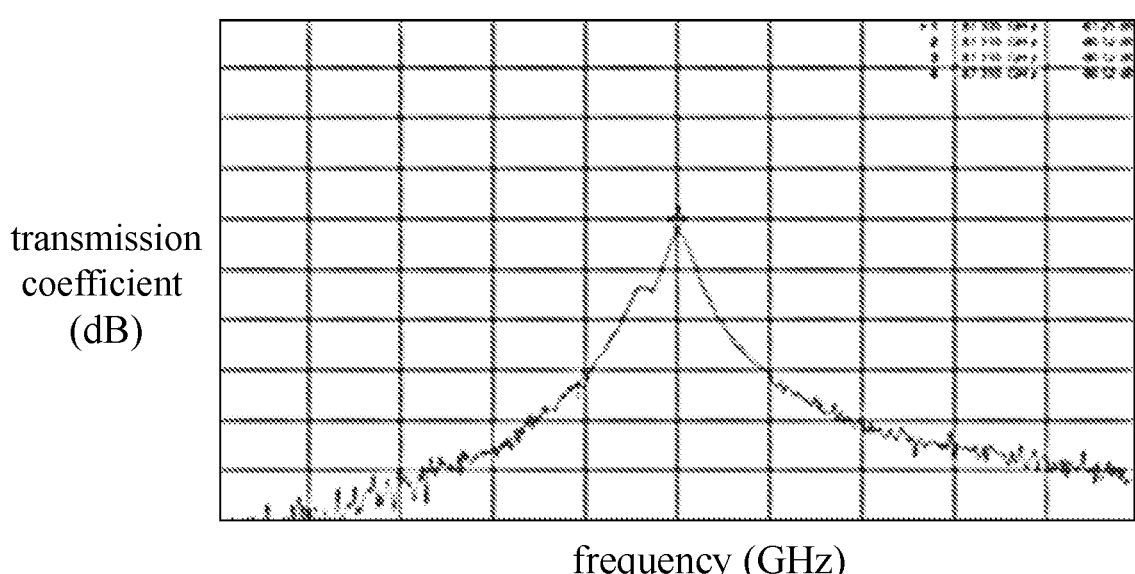
FIG. 3B is a drawing showing the resonance waveform where the degeneracy of the resonation is resolved by the anisotropy (small anisotropy).
Figure 3C:
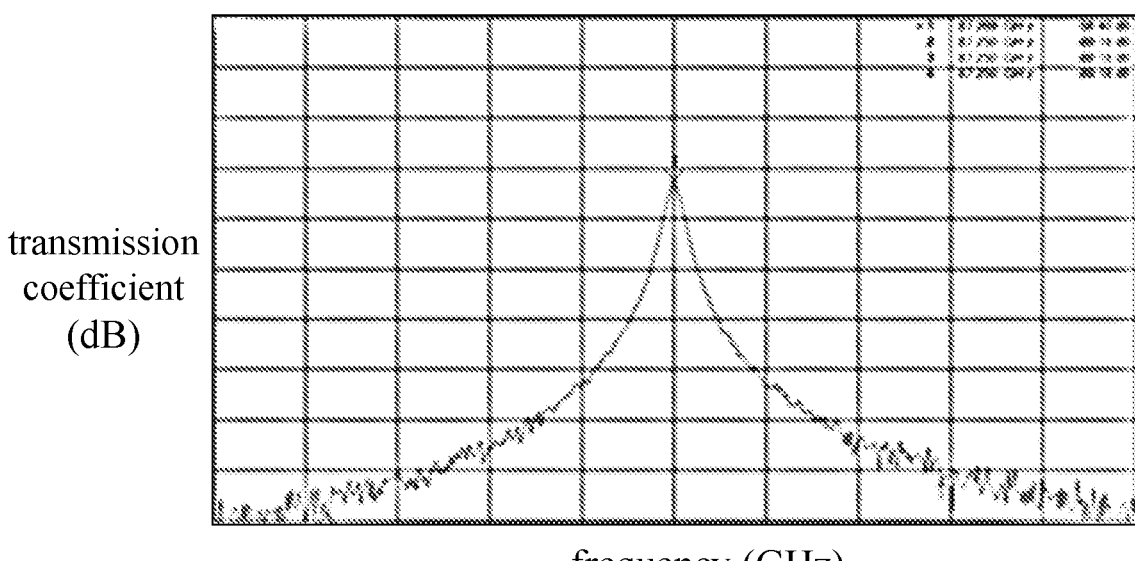
FIG. 3C is a drawing showing the resonance waveform of the sample without having the anisotropy.

FIGS. 3A to 3C are drawings showing the resonance waveforms when the resonance characteristics of three kinds of samples (large anisotropy: FIG. 3A, small anisotropy: FIG. 3B, without anisotropy: FIG. 3C) are measured by using the conventional Fabry-Perot resonator without having the grooves 17. When the resonance characteristics of the sample (liquid crystal polymer (LCP)) having large anisotropy are measured by using the conventional Fabry-Perot resonator without having the grooves 17 on the reflection spherical surface, the resonance is separated significantly and two resonances are observed in the resonance waveform as shown in FIG. 3A. In case of the sample (polyimide) having small anisotropy, "bump" is seen relatively near a peak of the resonance (lower frequency than the resonance frequency) and the deformation of the resonance waveform is observed as shown in FIG. 3B. In case of the sample (Cyclo Olefin Polymer (COP)) without the anisotropy, the deformation of the measured resonance waveform is not observed as shown in FIG. 3C.

Figure 4A:
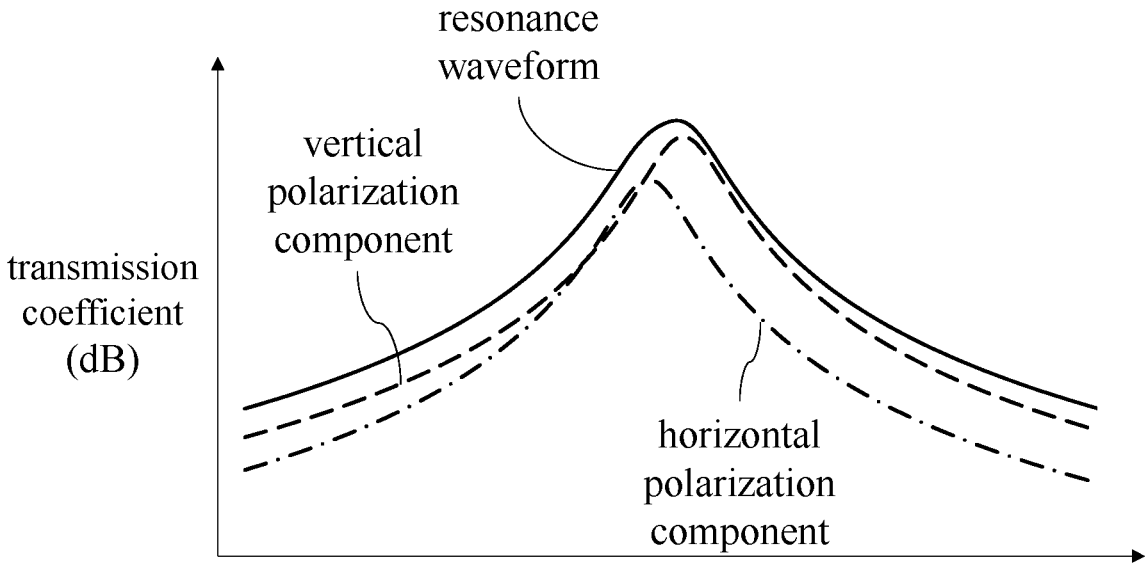
FIG. 4A is a drawing for explaining the resonance waveform where the degeneracy of the resonation is resolved by the anisotropy.
Figure 4B:
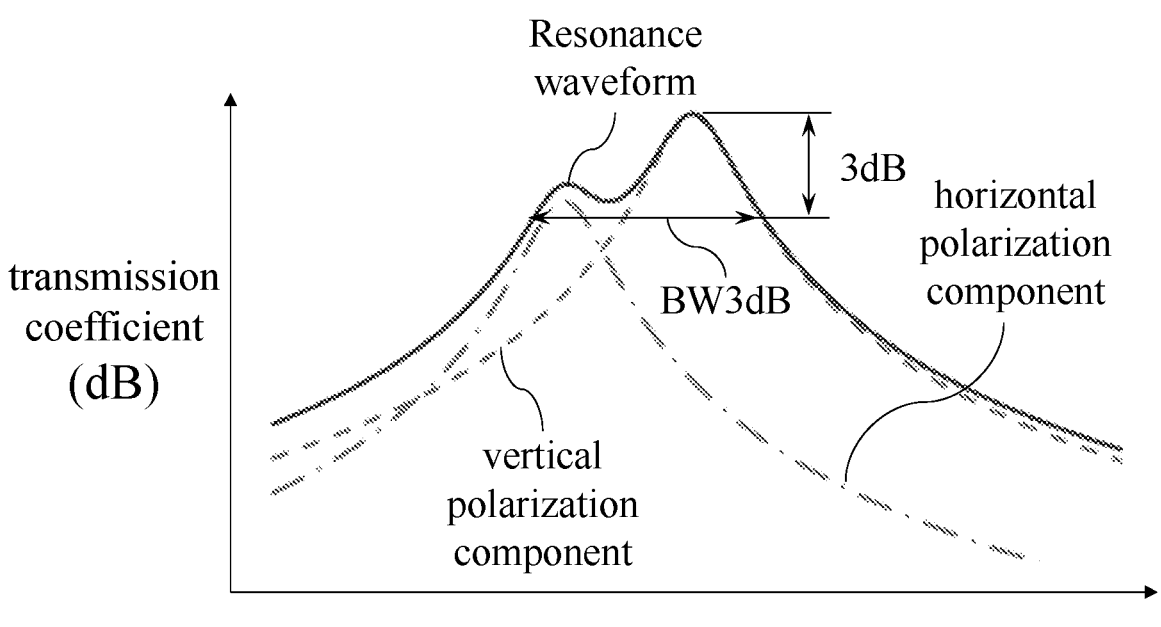
FIG. 4B is a drawing for explaining the resonance waveform where the degeneracy of the resonation is resolved by the anisotropy.

FIG. 4A and FIG. 4B are drawings for explaining the resonance waveform where the degeneracy of the resonation is resolved by the anisotropy. When the degeneracy of the resonation is resolved by the anisotropy of the sample 25 and the resonance frequency of the horizontal polarization component is located near the resonance frequency of the vertical polarization component as shown in FIG. 4A, the resonance frequency in the measured resonance waveform is shifted from the resonance frequency of the vertical polarization component toward the resonance frequency of the horizontal polarization component. When the resonance frequency is shifted, an error is caused in the measurement value of the relative dielectric constant. In addition, when the degeneracy of the resonation is resolved by the anisotropy of the sample 25 and the resonance frequency of the horizontal polarization component is located in the 3 dB band width $BW_{3dB}$ of the resonance waveform of the vertical polarization component as shown in FIG. 4B, the 3 dB band width $BW_{3dB}$ larger than the 3 dB band width $BW_{3dB}$ of the resonance waveform of the vertical polarization component is measured in the measured resonance waveform. When the 3 dB band width $BW_{3dB}$ becomes larger, an error is caused in the measurement value of the dielectric tangent. Note that the location (high frequency side or low frequency side) of the resonance of the horizontal polarization component with respect to the vertical polarization component varies depending on the magnitude relation between the dielectric constant in the vertical direction and the dielectric constant in the horizontal direction of the sample 25 to be measured.

Figure 5:
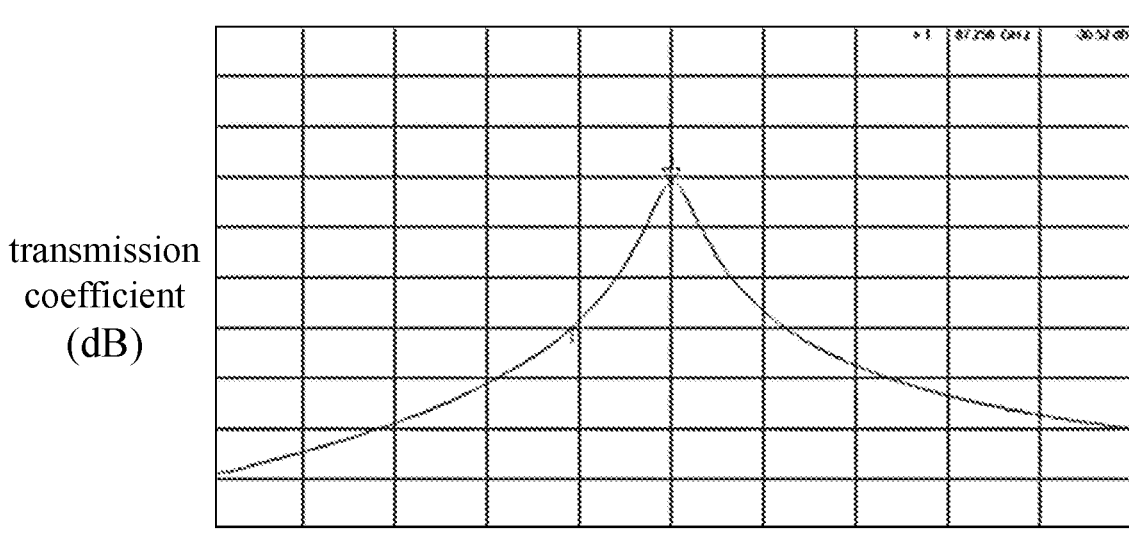
FIG. 5 is a schematic diagram showing the resonance waveform measured by the Fabry-Perot resonator concerning the embodiment 1.

FIG. 5 is the drawing showing the resonance waveform when the resonance characteristics of the sample having relatively low anisotropy are measured by using the Fabry-Perot resonator 100 with the grooves 17 on the first spherical reflection mirror 11. When the resonance characteristics of the sample (polyimide) having relatively low anisotropy are measured by using the Fabry-Perot resonator 100 with the grooves 17 on the first spherical reflection mirror 11, "bump" shown in FIG. 3B is not seen and the deformation of the resonance waveform is not observed as shown in FIG. 5. This is because the surface current generated on the surface of the first reflection spherical surface 13 in the horizontal direction is suppressed by the grooves 17 and the resonance caused by the horizontal polarization component of the input signal is substantially eliminated and only the resonance of the vertical polarization component is observed.

In the Fabry-Perot resonator 100, two grooves 17A, 17B are formed on the first reflection spherical surface 13 of the first spherical reflection mirror 11. However, it is also possible to form two grooves similar to the grooves 17A, 17B also on the second reflection spherical surface 14 of the second spherical reflection mirror 12, for example. It is also possible to form the groove 17B on the second reflection spherical surface 14 instead of the first reflection spherical surface 13. As described above, the grooves 17 can be formed on one of the first reflection spherical surface 13 and the second reflection spherical surface 14 while the grooves 17 can be formed on both of them. When the grooves 17 are formed on both of them, the shapes of the grooves can be the same although it is also possible that the shapes are different from each other. The number of the grooves 17 (i.e., total length of the grooves 17 in the vertical direction) formed on the two reflection spherical surfaces in the vertical direction can be specified so that the reflection of the horizontal polarization component of the input signal to be inputted can be suppressed sufficiently.

In the Fabry-Perot resonator 100, along the ZX-plane passing through the central axis C, the groove 17A is formed in the +X-direction from the vicinity of the first coupling hole 15 to the end portion of the first reflection spherical surface 13, the groove 17B is formed in the −X-direction from the vicinity of the first coupling hole 15 to the end portion of the first reflection spherical surface 13 and the grooves 17 are arranged axially symmetrically and plane-symmetrically. However, it is not necessary to arrange the grooves 17 axially symmetrically and plane-symmetrically. For example, at least one of the two grooves 17 can be specified to be shorter than the other. When the grooves are formed on the reflection spherical surface in the vertical direction, the total length of the grooves 17 can be specified so that the reflection of the horizontal polarization component of the input signal to be inputted can be suppressed and the reflection of the horizontal polarization component can be suppressed sufficiently.

Embodiment 2

Figure 6A:
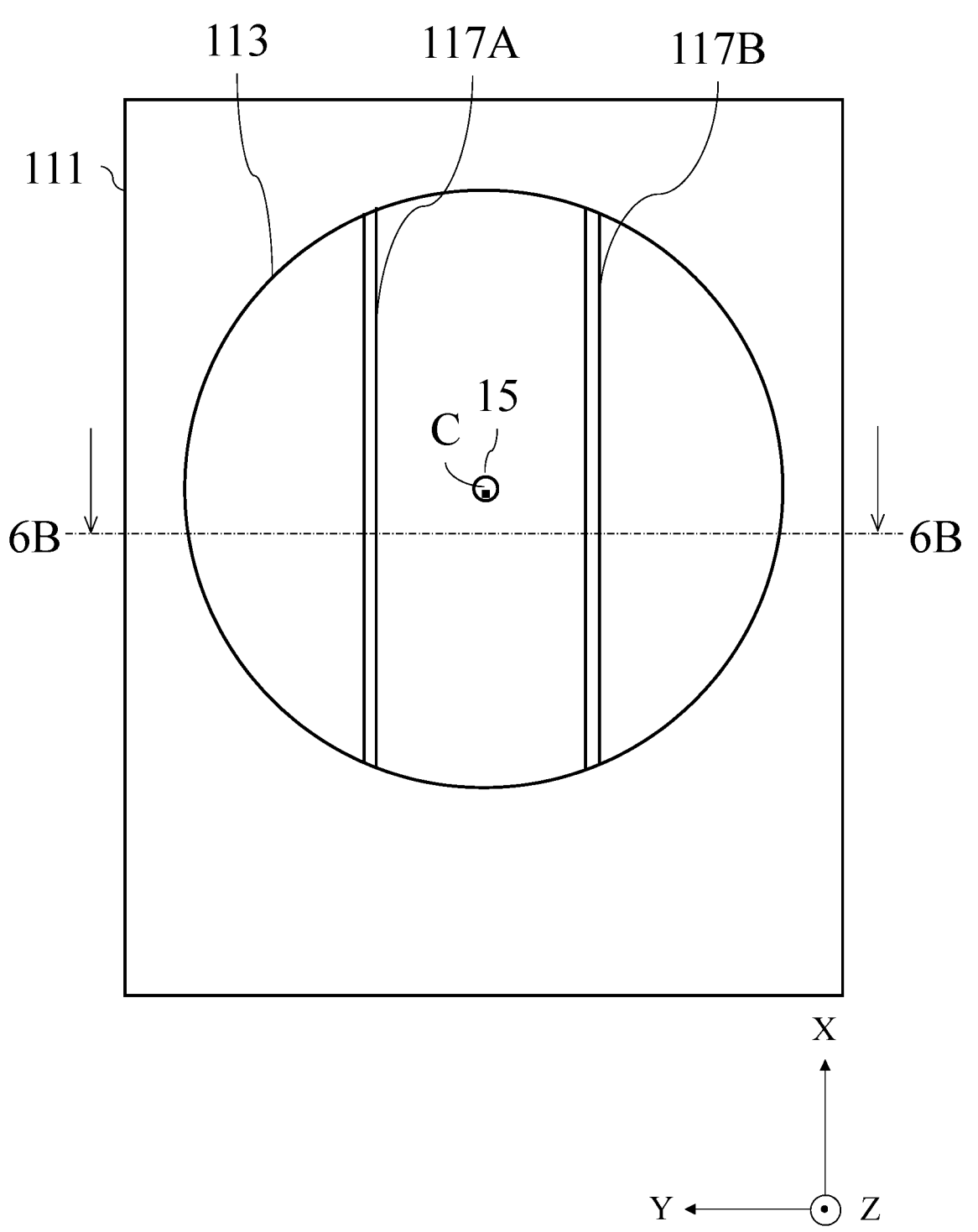
FIG. 6A is a schematic diagram of a spherical reflection mirror of the Fabry-Perot resonator viewed from the Z-direction concerning the embodiment 2.
Figure 6B:
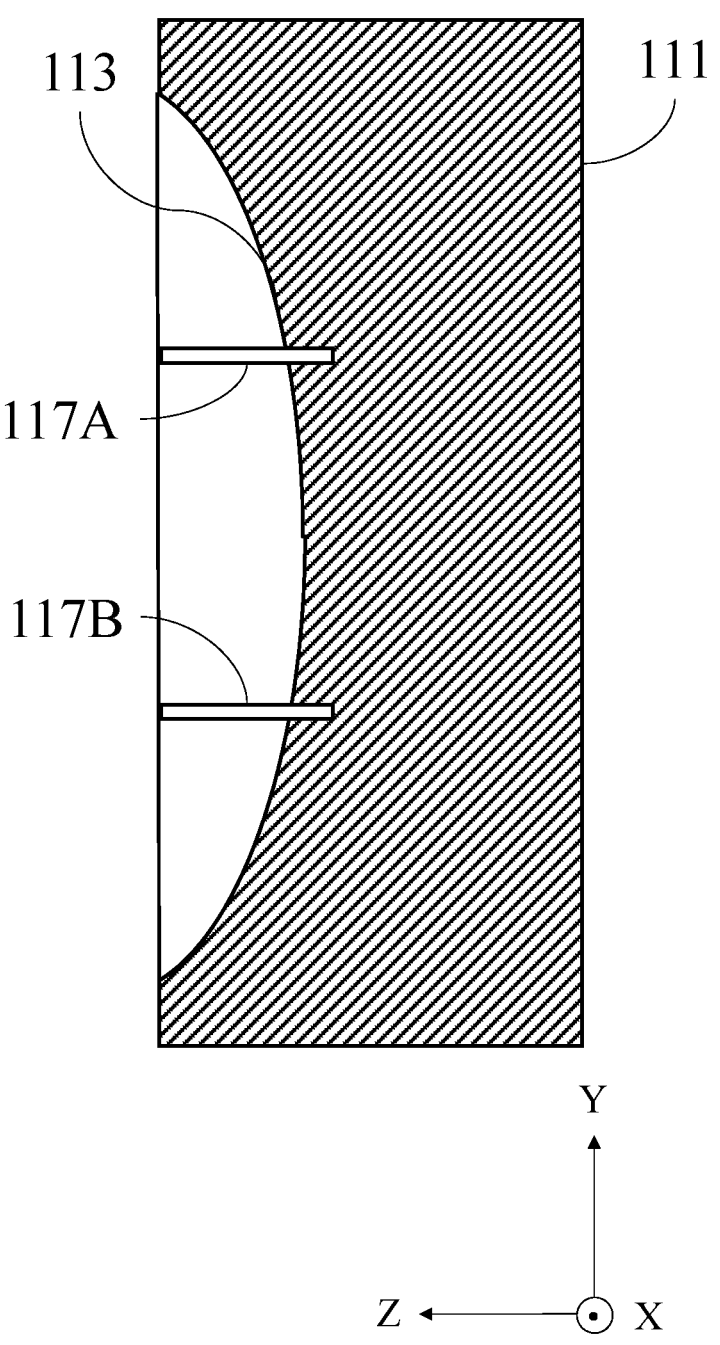
FIG. 6B is an explanation drawing showing a cross-section cut along a cross-sectional line 6B-6B shown in FIG. 6A.

FIG. 6A is a schematic diagram of a first spherical reflection mirror 111 of the Fabry-Perot resonator viewed from the Z-direction concerning the embodiment 2. FIG. 6B is an explanation drawing showing a cross-section cut along a cross-sectional line 6B-6B shown in FIG. 6A. The first spherical reflection mirror 111 has two grooves 117A, 1176 (collectively called grooves 117) formed on a first reflection spherical surface 113 and arranged in the Y-direction as shown in FIG. 6A and FIG. 6B. In the above described point, the embodiment 2 is different from the first spherical reflection mirror 11 of the embodiment 1 having two grooves 17 formed on the first reflection spherical surface 13 and arranged in the X-direction. Specifically, although the two grooves 117 of the embodiment 2 are formed in parallel with the ZX-plane (i.e., the vertical direction) same as the grooves 17 of the embodiment 1, the two grooves 117 of the embodiment 2 are not arranged on the ZX-plane passing through the central axis C of the first reflection spherical surface 113 different from the embodiment 1 where the two groove 17 are arranged on the ZX-plane passing through the central axis C of the first reflection spherical surface 13. The groove 117A is formed on the +Y-direction side of the central axis C while the groove 117B is formed on the −Y-direction side of the central axis C. The grooves are formed in the vertical direction from one end portion to the other end portion of the first reflection spherical surface 113 and arranged plane-symmetrically with respect to the ZX-plane. It is not necessary to form the grooves 117 to the end portions as long as the grooves 17 are formed to the vicinity of the end portion of the first reflection spherical surface 113 (the distance to the end portion is approximately 1 mm). The depth and the width of the grooves 117 are same as those of the grooves 17 of the embodiment 1. Since the other configurations of the Fabry-Perot resonator of the embodiment 2 are same as those of the Fabry-Perot resonator 100 of the embodiment 1, the explanation of the other configurations is omitted by assigning the same reference numerals.

In also the Fabry-Perot resonator of the embodiment 2, since the surface current flowing in the direction crossing the grooves 117 is suppressed, the reflection of the horizontal polarization component of the input signal is suppressed and the deformation is not generated on the measured resonance waveform even when the resonance characteristics of the sample 25 having the anisotropy are measured.

In the Fabry-Perot resonator of the embodiment 2, the grooves 117 are formed only on the first reflection spherical surface 113 in the first reflection spherical surface and the second reflection spherical surface as an example. However, the grooves can be formed on both the first reflection spherical surface and the second reflection spherical surface and the shapes of the grooves can be different from each other when the grooves are formed on both of them. Since the above described point is same as the embodiment 1, the explanation is omitted. In the Fabry-Perot resonator of the embodiment 2, two grooves 117 are formed on the first reflection spherical surface 113 of the first spherical reflection mirror 111. However, the number of the grooves 117 can be one, three or more. In addition, the example of arranging the grooves 117 plane-symmetrically is explained. However, it is not necessary to arrange the grooves 117 plane-symmetrically. The number of the grooves 117 (i.e., total length of the grooves 117 in the vertical direction) can be specified so that the reflection of the horizontal polarization component of the input signal to be inputted can be suppressed sufficiently.

Embodiment 3

Figure 7A:
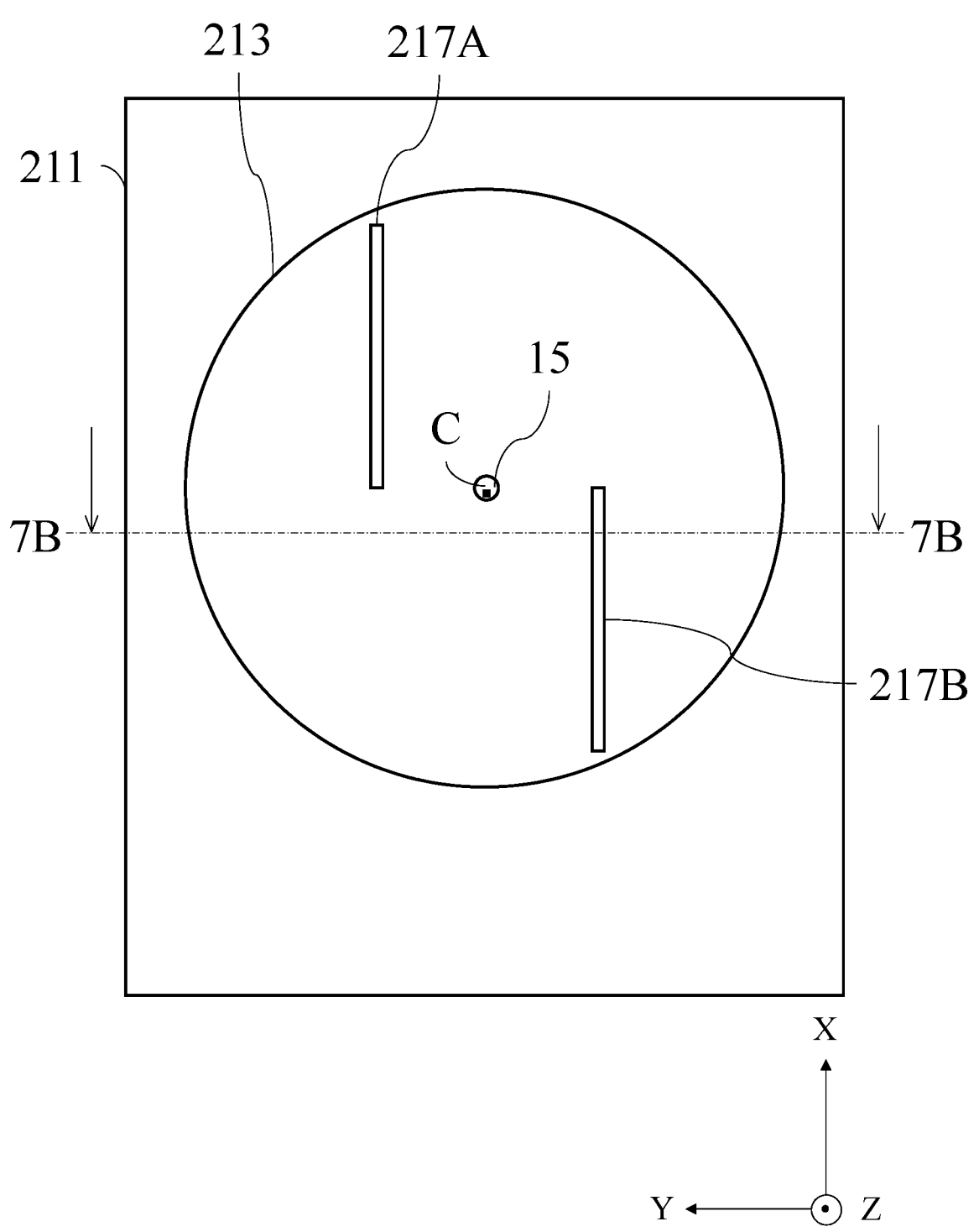
FIG. 7A is a schematic diagram of a spherical reflection mirror of the Fabry-Perot resonator viewed from the Z-direction concerning the embodiment 3.
Figure 7B:
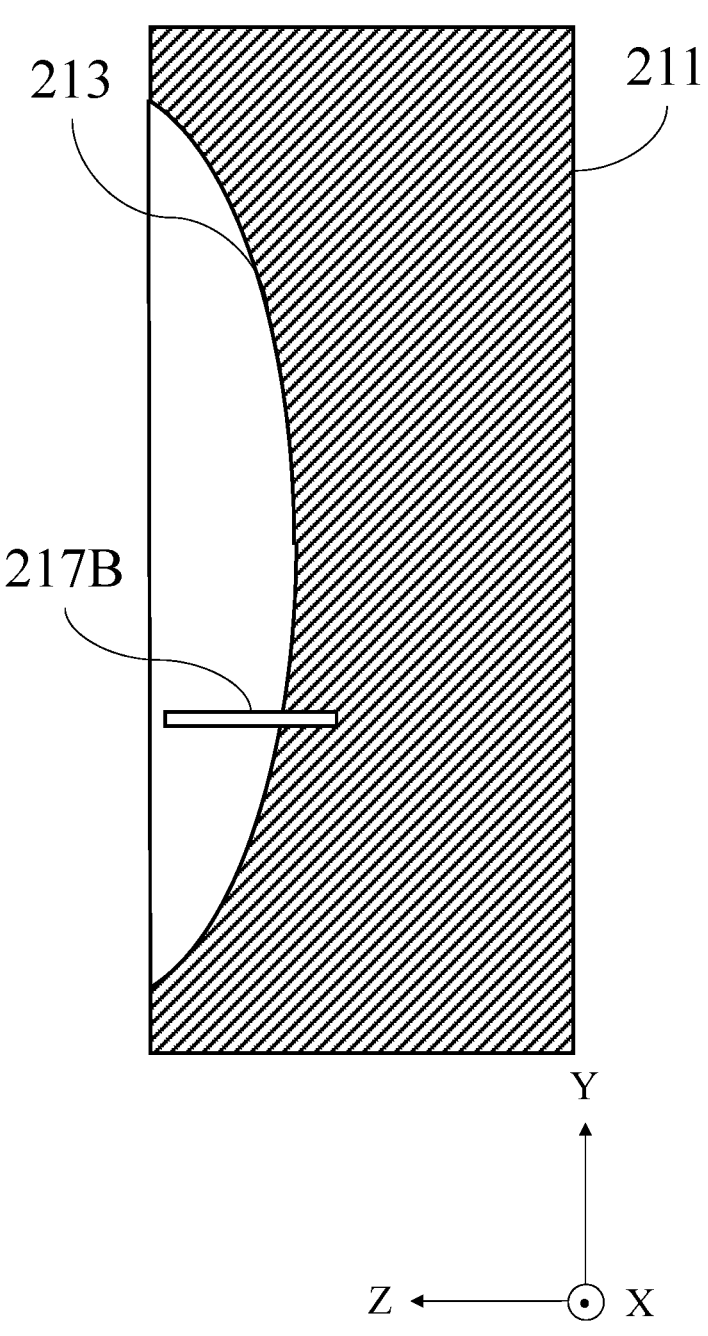
FIG. 7B is an explanation drawing showing a cross-section cut along a cross-sectional line 7B-7B shown in FIG. 7A.

FIG. 7A is a schematic diagram of a first spherical reflection mirror 211 of the Fabry-Perot resonator viewed from the Z-direction concerning the embodiment 3. FIG. 7B is an explanation drawing showing a cross-section cut along a cross-sectional line 7B-7B shown in FIG. 7A. The first spherical reflection mirror 211 has two grooves 217A, 217B (collectively called grooves 217) formed at an upper left side (+X-direction and +Y-direction) and a lower right side (−X-direction and −Y-direction) viewed in the Z-direction around the central axis C as shown in FIG. 7A. In the above described point, the embodiment 3 is different from the first spherical reflection mirror 111 of the embodiment 2 having two grooves 117 arranged in the Y-direction. Specifically, the grooves 217A is formed on the +Y-direction side of the central axis C and formed in the +X-direction in the vertical direction from the YZ-plane passing through the central axis C to the vicinity of a first reflection spherical surface 213, and the grooves 217B is formed on the −Y-direction side of the central axis C and formed in the −X-direction in the vertical direction from the YZ-plane passing through the central axis C to the vicinity of the first reflection spherical surface 213. The grooves 217 are formed to the vicinity of the end portion of the first reflection spherical surface 213 without forming the groove 217 to the end portion because it is difficult to process the end portion with high accuracy. Although the grooves 217 are formed in parallel with the ZX-plane (i.e., the vertical direction) same as the grooves 117 of the embodiment 2, the length of the grooves is shorter than that of the grooves 117. In addition, the grooves 217 are arranged axially symmetrically with respect to the central axis C. The depth and the width of the grooves 217 are same as those of the grooves 17 of the embodiment 1. Since the other configurations of the Fabry-Perot resonator of the embodiment 3 are same as those of the Fabry-Perot resonator 100 of the embodiment 1, the explanation of the other configurations is omitted by assigning the same reference numerals.

In also the Fabry-Perot resonator of the embodiment 3, since the surface current flowing in the direction crossing the grooves 217A, 217B is suppressed, the reflection of the horizontal polarization component of the input signal is suppressed and the deformation is not generated on the measured resonance waveform even when the resonance characteristics of the sample 25 having the anisotropy are measured.

In the Fabry-Perot resonator of the embodiment 3, the grooves 217 are formed only on the first reflection spherical surface 213 in the first reflection spherical surface and the second reflection spherical surface. However, the grooves can be formed on both the first reflection spherical surface and the second reflection spherical surface and the shapes of the grooves can be different from each other when the grooves are formed on both of them. Since the above described point is same as the embodiment 1, the explanation is omitted.

In the Fabry-Perot resonator of the embodiment 3, two grooves 217A, 217B are formed on the first reflection spherical surface 213 of the first spherical reflection mirror 211. However, it is possible to form only one of the grooves 217A and the groove 217B. In addition, the example of arranging the grooves 217 axially symmetrically is explained. However, it is not necessary to arrange the grooves 217 axially symmetrically. Furthermore, the grooves 217 can be formed on at least one of the upper right side (+X-direction and −Y-direction) and the lower left side (−X-direction and +Y-direction) viewed in the Z-direction around the central axis C so that the number of the grooves 217 is three or more. When the grooves are formed on the reflection spherical surface in the vertical direction, the number of the grooves 217 (i.e., total length of the grooves 217 in the vertical direction) can be specified so that the reflection of the horizontal polarization component of the input signal to be inputted can be suppressed and the reflection of the horizontal polarization component can be suppressed sufficiently.

OTHER EMBODIMENTS

In the Fabry-Perot resonator 100 of the embodiment 1, the grooves 17 are arranged on the ZX-plane passing through the central axis C of the first reflection spherical surface 13 as an example. It is also possible to form two grooves 117 explained in the embodiment 2 on the first reflection spherical surface 13 in addition to the grooves 17. When the reflection of the horizontal polarization component of the input signal to be inputted cannot be suppressed sufficiently, it is possible to increase the grooves in the vertical direction for further suppressing the reflection of the horizontal polarization component.

In the embodiments 1 to 3, the grooves 17, 117, 217 are formed respectively on the first reflection spherical surfaces 13, 113, 213 as an example and it is explained that the grooves similar to the grooves 17, 117, 217 can be formed also on the second reflection spherical surface 14. When the grooves are formed on both the first reflection spherical surface and the second reflection spherical surface, the shape pattern of the grooves formed on the first reflection spherical surface is not necessarily same as the shape pattern of the grooves formed on the second reflection spherical surface.

For example, it is possible to form the grooves same as the grooves 117 of the embodiment 2 or the grooves 217 of the embodiment 3 on the second reflection spherical surface 14 in the Fabry-Perot resonator 100 of the embodiment 1. As described above, the first reflection spherical surface and the second reflection spherical surface can be formed by appropriately combining the grooves 17, 117, 217 explained in the embodiments 1 to 3.

In the embodiments 1 to 3, the example where the vertical direction which is the formation direction of the grooves 17, 117, 217 is substantially matched with the direction of the electric field of the input signal is explained. Strictly speaking, when the formation direction of the grooves is matched with the direction of the electric field of the input signal, the surface current in the horizontal direction is suppressed most efficiently without substantially affecting the surface current of the vertical direction and the resonance of the horizontal polarization component of the input signal is reduced to an unmeasurable level. However, even when the formation direction of the grooves is not exactly matched with the direction of the electric field of the input signal and they have a certain angle, the resonance due to the horizontal polarization component is significantly reduced compared to the vertical polarization component of the input signal as long as the surface current can be suppressed significantly compared to the surface current of the vertical direction. It can be said that the formation direction of the grooves is substantially matched with the direction of the electric field of the input signal in the above described case since the resonance measurement of the vertical polarization component is possible without receiving the effect of the resonance due to the horizontal polarization component of the input signal. As the angle between the formation direction of the grooves and the direction of the electric field of the input signal becomes larger, the influence to the surface current of the vertical direction becomes larger and the reduction of the resonance due to the vertical polarization component of the input signal becomes larger, while the suppression to the surface current in the horizontal direction becomes smaller and the reduction of the resonance due to the horizontal polarization component of the input signal becomes smaller. Accordingly, in order to efficiently remove the resonance due to the horizontal polarization component of the input signal and perform the resonance measurement by the vertical polarization component, the angle between the formation direction of the grooves and the direction of the electric field of the input signal when projected on the XY-plane (plane perpendicular to the central axis C) should be 30 degrees (preferably 15 degrees, more preferably 5 degrees) or less.

In the Fabry-Perot resonator of the embodiments 1, 2, the waveguide is used for the signal injection portion and the signal detection portion. It is also possible to use a coaxial cable having a loop antenna at an end portion instead of the waveguide depending on the frequency to be measured.

In the Fabry-Perot resonator of the embodiments 1, 2, the example is explained where the grooves 17, 117 are formed on the first reflection spherical surfaces 13, 113 in the vertical direction and the direction of the electric field of the input signal is the vertical direction. It is also possible to form the grooves on the reflection spherical surface in the horizontal direction and inputting the input signal to measure the dielectric characteristic of the sample in a state that the direction of the electric field of the input signal is horizontal direction. Namely, regardless of the vertical direction and the horizontal direction, the dielectric characteristic of the sample having anisotropy can be measured more precisely by substantially aligning the formation direction of the grooves formed on the reflection spherical surface with the direction of the electric field of the input signal.

INDUSTRIAL APPLICABILITY

The open resonator of the present invention is suitable for measuring the dielectric characteristic of the sample having anisotropy in the dielectric constant with high accuracy.

DESCRIPTION OF THE REFERENCE NUMERALS

10: fixing stand
11, 111, 211: first spherical reflection mirror
12: second spherical reflection mirror
13, 113, 213: first reflection spherical surface
14: second reflection spherical surface
15: first coupling hole
16: second coupling hole
17, 17A, 17B, 117, 117A, 117B, 217, 217A, 217B: groove
20: sample stand
21: through hole
22: micrometer
25: sample
30: cover
41: first waveguide
42: second waveguide
100: Fabry-Perot resonator
$BW_{3dB}$: 3 dB band width
C: central axis
D0: spherical surface distance

The invention claimed is:

1. An open resonator comprising:
two spherical reflection mirrors respectively having two reflection spherical surfaces which are arranged to face each other; and
a signal injection portion for inputting an input signal used for measuring a dielectric characteristic of a sample arranged between the two reflection spherical surfaces, wherein
at least one of the two spherical reflection mirrors has a groove formed along at least one of the two reflection spherical surfaces of the at least one of the two spherical reflection mirrors.

2. The open resonator according to claim 1, wherein the groove is formed in a direction substantially same as a direction of an electric field of the input signal.

3. The open resonator according to claim 1, wherein an angle between a formation direction of the groove and a direction of an electric field of the input signal inputted from the signal injection portion is 30 degrees or less.

4. The open resonator according to claim 1, wherein the groove is arranged in parallel with a plane passing through a central axis connecting centers of the two reflection spherical surfaces.

5. The open resonator according to claim 1, wherein the groove is arranged along a plane passing through a central axis connecting centers of the two reflection spherical surfaces.

6. The open resonator according to claim 1, wherein each of the two spherical reflection mirrors has a coupling hole at a center of each of the two reflection spherical surfaces,
the groove is arranged to separate from the coupling hole at a predetermined interval, and the groove is arranged axially symmetrically with respect to the central axis or plane-symmetrically with respect to a plane passing through the central axis.

7. The open resonator according to claim 1, wherein a depth of the groove is more than or equal to one-eighth of a wavelength of a measurement frequency and less than a half of the wavelength of the measurement frequency.

\* \* \* \* \*